UNITED STATES PATENT OFFICE.

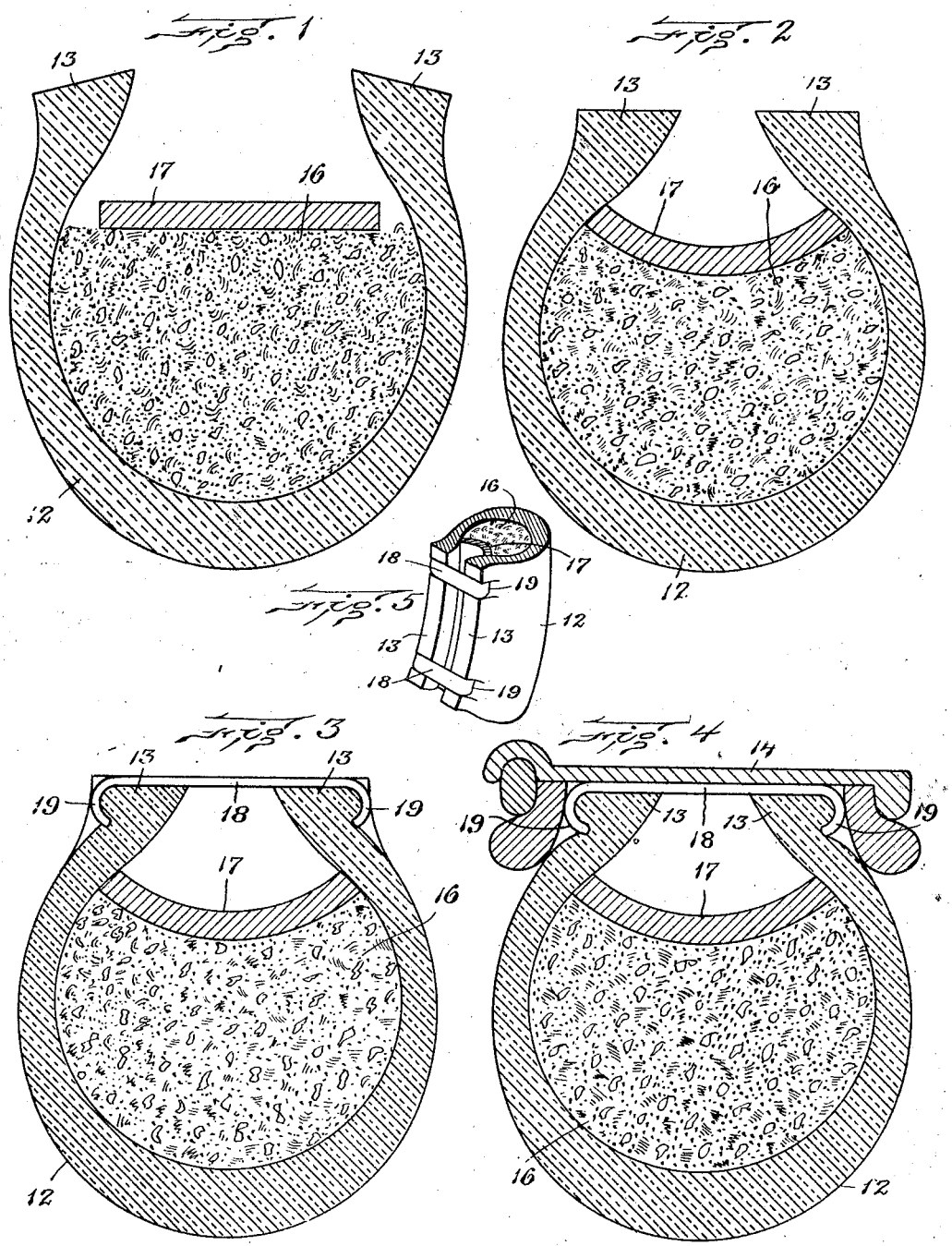

JOHN H. POOLE, OF BROCKTON, MASSACHUSETTS, ASSIGNOR OF THREE-EIGHTHS TO FRANK L. PRICE AND THREE-EIGHTHS TO JAMES G. WILDE, OF BROCKTON, MASSACHUSETTS.

CUSHION-TIRE FOR VEHICLE-WHEELS.

942,842.    Specification of Letters Patent.    Patented Dec. 7, 1909.

Application filed December 15, 1908. Serial No. 467,729.

*To all whom it may concern:*

Be it known that I, JOHN H. POOLE, of Brockton, in the county of Plymouth and State of Massachusetts, have invented certain new and useful Improvements in Cushion-Tires for Vehicle-Wheels, of which the following is a specification.

This invention relates to cushion tires for motor vehicles and other wheels, and it has for its object to provide a tire which, without being inflatable, possesses substantially the same desirable qualities as to resilience as a pneumatic tire, and is at the same time much more durable and reliable.

The invention consists in a cushion tire comprising a flexible shoe having a longitudinally divided transversely flat inner face adapted to be seated on a wheel rim, a cushion preferably of granular cork packed closely within the shoe and backing the tread portion thereof, and means for coupling together or connecting the parts of the divided inner face of the shoe to confine the said cushion within the shoe, the said confining means being preferably a series of clamping strips formed at their ends to engage the outer sides of the shoe, the strips being adapted to be interposed between the divided inner face and the wheel rim.

Of the accompanying drawings, forming a part of this specification,—Figure 1 represents a transverse section showing the tire shoe in an open condition and the cork cushion inserted therein. Fig. 2 represents a transverse section showing the sides of the shoe moved inwardly to compress the cork cushion and engage the edges of a diaphragm which backs the same. Fig. 3 represents a view similar to Fig. 2, showing one of the coupling strips applied to the shoe. Fig. 4 represents a view similar to Fig. 3 showing a transverse section of the wheel rim to which the tire is applied. Fig. 5 represents a perspective view of a portion of the tire in the condition shown in Fig. 3.

The same reference characters indicate the same parts in all the figures.

In the drawings, 12 represents a flexible shoe which may be composed of textile fabric, such as canvas, and rubber, the shoe, so far as the materials of which it is composed is concerned, being of ordinary construction. The flattened edges 13 of the shoe are formed to collectively constitute a divided transversely flat inner face adapted to be seated on a transversely flat wheel rim 14, which is so constructed as to permit the application of the tire in its operative condition to the rim, means being provided for securing the tire firmly to the rim after its application thereto.

16 represents a filling of granular cork which is inserted in the interior of the shoe while the latter is in an open condition, as shown in Fig. 1, said filling constituting a cushion which is in contact with and backs the tread portion of the shoe. In inserting the cork filling, the granular material is packed closely, the quantity of said material being preferably such that the filling does not entirely occupy the interior of the shoe. While the shoe is open, as shown in Fig. 1, I apply a diaphragm 17 to the inner surface of the filling, said diaphragm being preferably a relatively thick strip adapted to extend around the interior of the shoe, and composed of textile fabric and rubber, or any other suitable material or materials. The filling and the diaphragm being in place, as shown in Fig. 1, the sides of the shoe are moved inwardly toward each other, and are thus brought in contact with the edges of the diaphragm, and at the same time caused to compress the filling, the result of this operation being the lateral bending of the diaphragm into the arched form shown in Fig. 2, the edges of the diaphragm being supported by the sides of the shoe so that the diaphragm forms a resilient backing for the cork filling or cushion 16. When the sides of the shoe are moved inwardly toward each other, they first contact with the edges of the diaphragm, and further movement of the sides of the shoe toward each other curves the diaphragm in a direction to arch it toward the cork filling and to compress the latter. The sides of the shoe are now coupled together or connected by suitable means, such as transverse coupling strips 18 having hooks 19 at their ends adapted to engage the outer sides of the shoe, as shown in Fig. 3, the hooks indenting the yielding sides of the shoe, and forming pockets therein. The coupling strips 18 are preferably thin flat metal strips adapted to lie upon the divided inner face of the shoe, and to be interposed between the latter and the wheel rim 14, as shown in Fig. 4.

In assembling the parts of the tire, the shoe is mounted on a suitable support so that it can be revolved from time to time, the filling being applied to the highest part of the shoe and secured by applying clamping strips 18, the operation of applying and securing the filling being carried on progressively until the entire shoe has been filled and its edges coupled together.

Granulated cork is the best cushion material known to me, on account of its combined lightness and resiliency. I have found that a satisfactory result may be produced by using such a quantity of cork that the cushion is of about the same weight as the inflatable inner tube located within the shoe of an ordinary pneumatic tire. I do not limit myself, however, to cork as the material of the cushion.

I claim:

A cushioned tire comprising a flexible shoe having edges collectively constituting a longitudinally divided transversely flat inner face adapted to be seated on a wheel rim by a lateral movement of the tire, a resilient cushion backing the tread portion of the shoe, a flexible diaphragm interposed between the side portions of the shoe and forming a backing for the cushion, and means for coupling together the parts of the inner face of the shoe to confine and arch the diaphragm toward the cushion.

In testimony whereof I have affixed my signature, in presence of two witnesses.

JOHN H. POOLE.

Witnesses:
C. F. BROWN,
PETER W. PEZZETTI.